United States Patent
Pahde et al.

(10) Patent No.: US 11,080,560 B2
(45) Date of Patent: *Aug. 3, 2021

(54) LOW-SHOT LEARNING FROM IMAGINARY 3D MODEL

(71) Applicant: SAP SE, Walldorf (DE)

(72) Inventors: Frederik Pahde, Berlin (DE); Mihai Puscas, Berlin (DE); Moin Nabi, Berlin (DE); Tassilo Klein, Berlin (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,407

(22) Filed: Dec. 27, 2019

(65) Prior Publication Data

US 2021/0201075 A1 Jul. 1, 2021

(51) Int. Cl.
*G06N 3/08* (2006.01)
*G06T 19/20* (2011.01)
*G06K 9/62* (2006.01)
*G06F 16/53* (2019.01)
*G06N 3/04* (2006.01)
*G06T 17/20* (2006.01)

(52) U.S. Cl.
CPC .......... *G06K 9/6256* (2013.01); *G06F 16/53* (2019.01); *G06K 9/6215* (2013.01); *G06N 3/0454* (2013.01); *G06N 3/08* (2013.01); *G06T 17/20* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| 6,466,695 | B1 | 10/2002 | Potzsch |
| 10,445,565 | B2 | 10/2019 | Tu |
| 2005/0047647 | A1 | 3/2005 | Rutishauser |

(Continued)

OTHER PUBLICATIONS

Pahde F, Nabi M, Klein T, Jahnichen P. Discriminative hallucination for multi-modal few-shot learning. In2018 25th IEEE International Conference on Image Processing (ICIP) Oct. 7, 2018 (pp. 156-160). IEEE.*

Liu Y, Lee J, Park M, Kim S, Yang E, Hwang SJ, Yang Y. Learning to propagate labels: Transductive propagation network for few-shot learning. arXiv preprint arXiv: 1805.10002. May 25, 2018.*

(Continued)

*Primary Examiner* — Zhengxi Liu
(74) *Attorney, Agent, or Firm* — Mintz, Levin, Cohn, Ferris, Glovsky and Popeo, P.C; Pedro Suarez; Paul Brockland

(57) ABSTRACT

In one aspect, there is provided a system including at least one data processor and at least one memory. The at least one memory may store instructions that cause operations when executed by the at least one data processor. The operations may include retrieving a set of authentic base class images from a database. The operations may further include generating, based on the set of authentic base class images, a three dimensional mesh of the base class. The operations may further include retrieving a set of authentic novel class images. The operations may further include generating, at a first neural network and based on the three dimensional mesh and the set of authentic novel class images, a set of synthetic novel class images. The operations may further include training a second neural network based on the set of synthetic novel class images.

20 Claims, 7 Drawing Sheets

(56) References Cited

U.S. PATENT DOCUMENTS

| | | |
|---|---|---|
| 2018/0341862 A1 | 11/2018 | Ehrman |
| 2019/0012526 A1 | 1/2019 | Guo |
| 2019/0026600 A1 | 1/2019 | Bagherinezhad |
| 2019/0080453 A1 | 3/2019 | Song |
| 2019/0147334 A1 | 5/2019 | Lisowska |
| 2019/0251952 A1 | 8/2019 | Arik |
| 2019/0258953 A1 | 8/2019 | Lang |
| 2019/0311814 A1 | 10/2019 | Kannan |
| 2019/0325183 A1 | 10/2019 | Tscherepanow |
| 2019/0382941 A1 | 12/2019 | Hwang |

OTHER PUBLICATIONS

Pahde F, Jähnichen P, Klein T, Nabi M. Cross-modal hallucination for few-shot fine-grained recognition. arXiv preprint arXiv: 1806.05147. Jun. 13, 2018.*

Hariharan B, Girshick R. Low-shot visual recognition by shrinking and hallucinating features. InProceedings of the IEEE International Conference on Computer Vision 2017 (pp. 3018-3027).*

Kanazawa A, Tulsiani S, Efros AA, Malik J. Learning category-specific mesh reconstruction from image collections. InProceedings of the European Conference on Computer Vision (ECCV) 2018 (pp. 371-386).*

Pahde F, Puscas M, Wolff J, Klein T, Sebe N, Nabi M. Low-shot learning from imaginary 3d model. In2019 IEEE Winter Conference on Applications of Computer Vision (WACV) Jan. 7, 2019 (pp. 978-985). IEEE.*

Pahde, et al., Self paced adversarial training for multimodal few-shot learning, Nov. 22, 2018, 10 pages. Retrieved from: https://arxiv.org/pdf/1811.09192.pdf.

Beery, et al., Synthetic examples improve generalization for rare classes, Proceedings of the IEEE/CVF Winter Conference on Applications of Computer Vision, 2020, 11 pages.

Lu, et al., Learning from very few samples: A survey, arXiv preprint 2009.02653, 2020.

* cited by examiner

LOW-SHOT LEARNING FROM IMAGINARY 3D MODEL

TECHNICAL FIELD

The subject matter described herein relates generally to machine learning and more specifically to low-shot learning by a machine learning model.

BACKGROUND

Machine learning models may be trained to perform a variety of cognitive tasks including, for example, object identification, natural language processing, information retrieval, speech recognition, classification, regression, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include an image or a textual description of the error associated with the ticket. As such, in order to determine a suitable response for addressing the error associated with the ticket, the enterprise resource planning system may include a machine learning model trained to perform text or image classification. For instance, the machine learning model may be trained to determine, based at least on the textual description of the error, a priority for the ticket corresponding to a severity of the error.

SUMMARY

Systems, methods, and articles of manufacture, including computer program products, are provided for low-shot learning by machine learning processing. In one aspect, there is provided a system including at least one data processor and at least one memory. The at least one memory may store instructions that cause operations when executed by the at least one data processor. The operations may include retrieving a set of authentic base class images from a database. The operations may further include generating, based on the set of authentic base class images, a three dimensional mesh of the base class. The operations may further include retrieving a set of authentic novel class images. The operations may further include generating, at a first neural network and based on the three dimensional mesh and the set of authentic novel class images, a set of synthetic novel class images. The operations may further include training a second neural network based on the set of synthetic novel class images. The second neural network may rank the set of synthetic novel class images and may output a set of highest ranked images from the set of synthetic novel class images. Training the second neural network may further include updating the second neural network based on the highest ranked images from the set of synthetic novel class images.

In some variations, one or more features disclosed herein including the following features can optionally be included in any feasible combination. The operations may further include adding the set of highest ranked images to the set of authentic novel class images. Generating the set of synthetic novel class images may be further based on the set of highest ranked images. The operations may further include training the first neural network based on the set of highest ranked images. Training the second neural network may further include updating the second neural network based on a loss distribution, the loss distribution indicating whether the output synthetic novel class images are classified as authentic or synthetic. The base class images may include birds and the novel class images may include a bird species. Generating the set of synthetic novel class images may include altering the three dimensional mesh based on an authentic novel class image of the set of authentic novel class images. Altering the three dimensional mesh may include rotating the three dimensional mesh to capture one or more viewpoints of the authentic novel class image. Altering the three dimensional mesh may include adding a texture of the authentic novel class image to the three dimensional mesh. Ranking the set of synthetic novel class images may include scoring the set of synthetic novel class images per category based on a similarity to the set of authentic novel class images. The highest ranked images may include the images with the highest score per category of image. Generating the set of synthetic novel class images may be based on a pose and a viewpoint of a base class image of the set of authentic base class images.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to preparing data for machine learning processing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
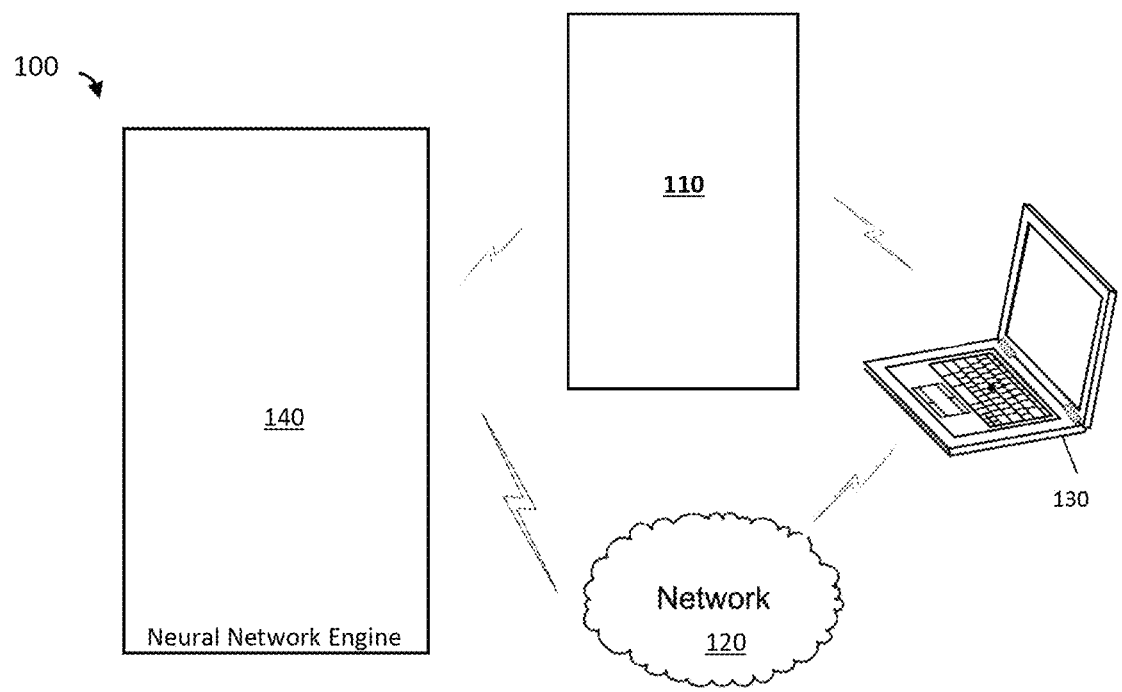
FIG. 1 depicts a system diagram illustrating a data processing system, in accordance with some example embodiments.

Since the introduction of deep learning techniques in computer vision applications, research has been conducted to reduce the amount of annotated data needed for training such systems. This data requirement problem has been approached by developing algorithms which either require less expensive annotations such as semi-supervised or weakly supervised approaches, or more rigorously no annotations at all such as unsupervised systems. Although in theory quite appealing, the usual trade-off in these systems when applicable, is the overall reduced performance.

In some aspects, the availability of annotated data may be heavily skewed, reflecting a tail distribution found in the wild. In consequence, research in the domain of low-shot learning (e.g., learning and generalizing from only a few training samples), has gained more and more interest. As such, generative approaches for artificially increasing the training set in low-shot learning scenarios have been shown to be effective. Specifically, it may be shown that with increasing quality and diversity of the generation output, the overall performance of the low-shot learning system may be boosted.

In this context, it may be beneficial to maximize visual generative capabilities of a low-shot learning system. Specifically, in a scenario where the base classes (e.g., common species) have a large amount of annotated data whereas the data for novel classes (e.g., rare species) are scarce. A base class may be a class, as in an object-oriented programming language, from which other classes are derived. For example, a base class may be generic bird species (e.g., flying birds) that have a large quantity of samples (e.g., a high quantity of images). A novel class may be derived from the base class such as a specific rare flying bird species that has only a few samples (e.g., a low quantity of images). To alleviate the data shortage for novel classes, it may be possible to implement a high quality generation stage by learning, based on samples from the base class, a 3D structure of the novel class. A curriculum-based discriminative sample selection method may further refine the generated data, which may promote learning more explicit visual classifiers.

Learning the 3D structure of the novel class may facilitate low-shot learning by allowing the low-shot learning system to generate synthetic images of the novel class from different viewpoints of the same object. Simultaneously, learning the novel objects' texture map may allow for a controlled transfer of the novel objects' appearance to new poses seen in the base class samples. Freely generating synthetic images (e.g., data) with respect to different poses and viewpoints of a single novel sample then in turn may allow a way to improve novel class data diversity. While reconstructing a 3D model from single images in a given category may exist, these methods lack easy applicability to a generating synthetic images setup and specifically miss any kind of texture and appearance reconstruction. The intuition behind the improved low-shot learning image generating performance is described herein.

The systems and methods described herein may expand the diversity of generating data from sparse samples of novel classes through learning a 3D structure and texture maps. Additionally, a self-paced learning strategy may facilitate reliable sample selection. This approach features robustness of generated images and outperforms the baseline in the challenging low-shot scenario.

FIG. 1 depicts a network diagram illustrating a network environment 100, in accordance with some example embodiments. Referring to FIG. 1, a training engine 110 may be communicatively coupled, via a wired and/or wireless network 120, to client device 130 and/or a neural network engine 140. The wired and/or wireless network 120 can be a wide area network (WAN), a local area network (LAN), and/or the Internet.

In some example embodiments, the neural network engine 140 may be configured to implement one or more machine learning models including, for example, a convolutional neural network. A convolutional neural network is a type of machine learning model that may be trained through supervised learning. For instance, training a convolutional neural network may include identifying errors that may be present in the classifications made by the convolutional neural network and subsequently minimizing these errors through repeated adjustments to the convolutional neural network. As such, the neural network engine 140 may be trained to serve as, for example, an image or data generator and/or classifier. According to some example embodiments, the training engine 110 may be configured to generate a mixed training set that includes both synthetic images and non-synthetic images. The training engine 110 may be further configured to process the mixed training set with a neural network (e.g., implemented by the neural network engine 140) and determine the performance of the neural network in classifying the images included the mixed training set. According to some example embodiments, the training engine 110 may generate, based at least on the performance of the convolutional neural network, additional training data. The additional training data may include images with modifications that may cause the neural network to misclassify one or more synthetic data in the mixed training set.

In some example embodiments, the training engine 110 may generate synthetic data (e.g., synthetic images) based on non-synthetic data (e.g., authentic images of a class) that are associated with one or more labels. For instance, the non-synthetic image may depict a three-dimensional scene that includes one or more objects (e.g., a bird or animal) within an environment (e.g., buildings, trees, streets). The non-synthetic images may be labeled with classifications that correspond to the objects depicted in these images. The labels associated with the non-synthetic data may correspond to the objects. To generate the synthetic data, the training engine 110 may apply, to the non-synthetic data, modifications to portions of the non-synthetic data. For example, the non-synthetic image may be modified by, for example, modifying the one or more objects and/or modifying the orientation (e.g., rotating) the one or more objects. The modifications to the non-synthetic image may also include altering the environment depicted in the non-synthetic image by at least applying, for instance, a different lighting and/or a different perspective (e.g., camera angle and/or position) to the non-synthetic image.

In some example embodiments, the client device 130 may provide a user interface for interacting with the training engine 110 and/or neural network engine 140. For example, a user may provide, via the client device 130, at least a portion of the non-synthetic data used to generate the mixed training set. The user may also provide, via the client device 130, one or more training sets, validation sets, and/or production sets for processing by the neural network engine 140. Alternately and/or additionally, the user may provide, via the client device 130, one or more configurations for the neural network engine 140 including, for example, conditional parameters (e.g., modifiers) such as demographic information, statistical information, or characteristics (e.g., race, age, genetic marker, disease, or the like) that is used by the neural network engine 140 when processing one or more mixed training sets, validation sets, and/or production sets. The user may further receive, via the client device 130, outputs from the neural network engine 140 including, for example, classifications for the mixed training set, validation set, and/or production set.

In some example embodiments, the functionalities of the training engine 110 and/or the neural network engine 140 may be accessed (e.g., by the client device 130) as a remote service (e.g., a cloud application) via the network 120. For instance, the training engine 110 and/or the neural network engine 140 may be deployed at one or more separate remote platforms. Alternately and/or additionally, the training engine 110 and/or the neural network engine 140 may be deployed (e.g., at the client device 130) as computer software and/or dedicated circuitry (e.g., application specific integrated circuits (ASICs)).

Figure 2:
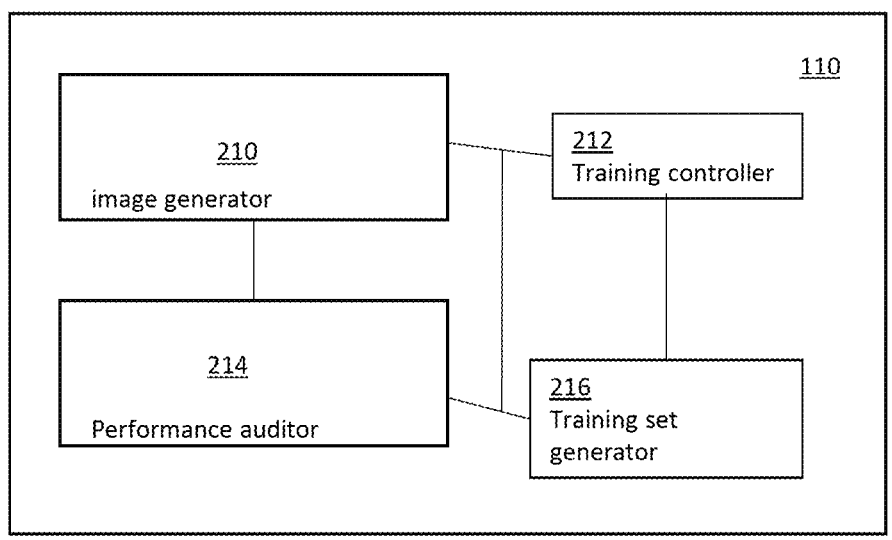
FIG. 2 is a block diagram of a training engine, in accordance with some example embodiments.

FIG. 2 depicts a block diagram illustrating the training engine 110, in accordance with some example embodiments. Referring to FIGS. 1-2, the training engine 110 may include an image generator 210, a training controller 212, a performance auditor 214, and a training set generator 216. It should be appreciated that the training engine 110 may include additional and/or different components.

As noted above, the training engine 110 may be configured to generate a mixed training set for training a neural network (e.g., implemented by the neural network engine 140). In some example embodiments, the synthetic image generator 210 may be configured to generate a plurality of synthetic images (e.g., data) that may be included in a mixed training set used for training the neural network. The synthetic image generator 210 may generate one or more synthetic images by at least generating the synthetic images based on a three dimensional (3D) mesh of non-synthetic images.

In some example embodiments, the training controller 212 may conduct additional training of the neural network based at least on the performance of the neural network in processing a mixed training set (e.g., as determined by the performance auditor 214). The training controller 212 may train the neural network using additional training data that have been generated (e.g., by the synthetic image generator 210 and/or the training set generator 216) to include synthetic images that have been subject to modifications that the performance auditor 214 determines to cause the neural network to misclassify synthetic images. Referring to the previous example, the performance auditor 214 may determine that the neural network is unable to successfully classify, for example, a threshold quantity (e.g., number, percentage) of synthetic images from authentic images. As such, the synthetic image generator 210 may generate additional synthetic images having changed characteristics.

Meanwhile the training controller 212 may train the neural network with additional training data that includes the synthetic images with changed characteristics (e.g., generated by the synthetic image generator 210). The training controller 212 may continue to train the neural network with additional training data until the performance of the neural network (e.g., as determined by the performance auditor 214) meets a certain threshold value (e.g., fewer than x number of misclassifications per training set and/or validation set) or a loss distribution determined by the neural network satisfies a threshold value. The loss distribution may include a probability that the input image is classified as a particular class (e.g., an authentic image or a synthetic image).

In some example embodiments, the performance auditor 214 may be configured to determine the performance of a neural network (e.g., implemented by the neural network engine 140) in processing the mixed training set. For example, the performance auditor 214 may determine, based on a result of the processing of a mixed training set performed by the neural network, that the neural network misclassifies synthetic images from the mixed training set that have been subject to certain modifications. To illustrate, the performance auditor 214 may determine, based on the result of the processing of the mixed training set, that the neural network (e.g., a discriminator) misclassified, for example, a first synthetic image. The first synthetic image may be generated by at least the synthetic image generator 210 generating the first synthetic image based on a three dimensional mesh of a base class. Accordingly, the performance auditor 214 may determine that the neural network (e.g., a discriminator) may be unable to successfully classify synthetic images from non-synthetic images. The performance auditor 214 may include a discriminator model that is updated with new synthetic images (e.g., data) or a loss distribution generated from the discriminator model to improve its ability to discriminate between synthetic and non-synthetic images (e.g., data).

In some example embodiments, the training set generator 216 may generate a mixed training set for training a neural network (e.g., implemented by the neural network engine 140). The mixed training set may include non-synthetic data, e.g., authentic images. The training set generator 216 may obtain the mixed training set from the client device 130.

Figure 3:
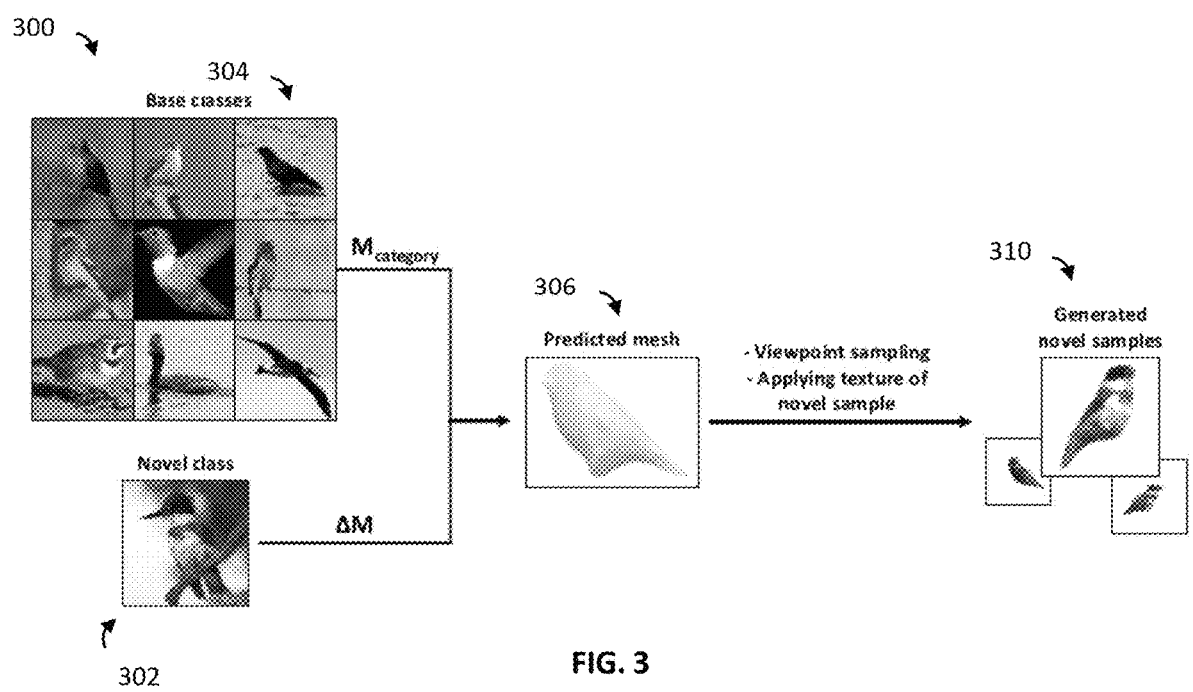
FIG. 3 a generative method for generating novel class image samples based on a predicted three dimensional mesh of a base class, in accordance with some example embodiments.

FIG. 3 depicts a generative method 300 for generating novel class image samples based on a predicted 3D mesh of a base class. As shown in the example of FIG. 3, a novel class 302 of a bird may only include a single authentic sample for generating synthetic images (e.g., data) of the novel class 302 (e.g., a rare bird). The method 300 may learn and generate a generic 3D mesh of a bird category from base class images 304 (e.g., base class of common birds). In some aspects, the 3D mesh may be generated based on differing viewpoints of the base class images 304. A variety of 3D imaging methods may be used to generate the 3D mesh such as, skinned multi-person linear model (SMPL), human mesh and motion recovery (HMMR), or the like.

At 306, the generic 3D mesh may be altered to fit the appearance of the novel class 302 bird (e.g., target bird). The altered 3D mesh may then be coated with the novel class 302 bird's texture and the altered 3D mesh of the novel class bird may be rotated to capture various viewpoints to generate samples 310 (e.g., two dimensional images that resemble the novel class 302 bird). With the new novel class image samples 310, a self-paced learning model may be implemented to train one or more neural networks to generate improved quality synthetic images of the novel class 302.

Figure 4:
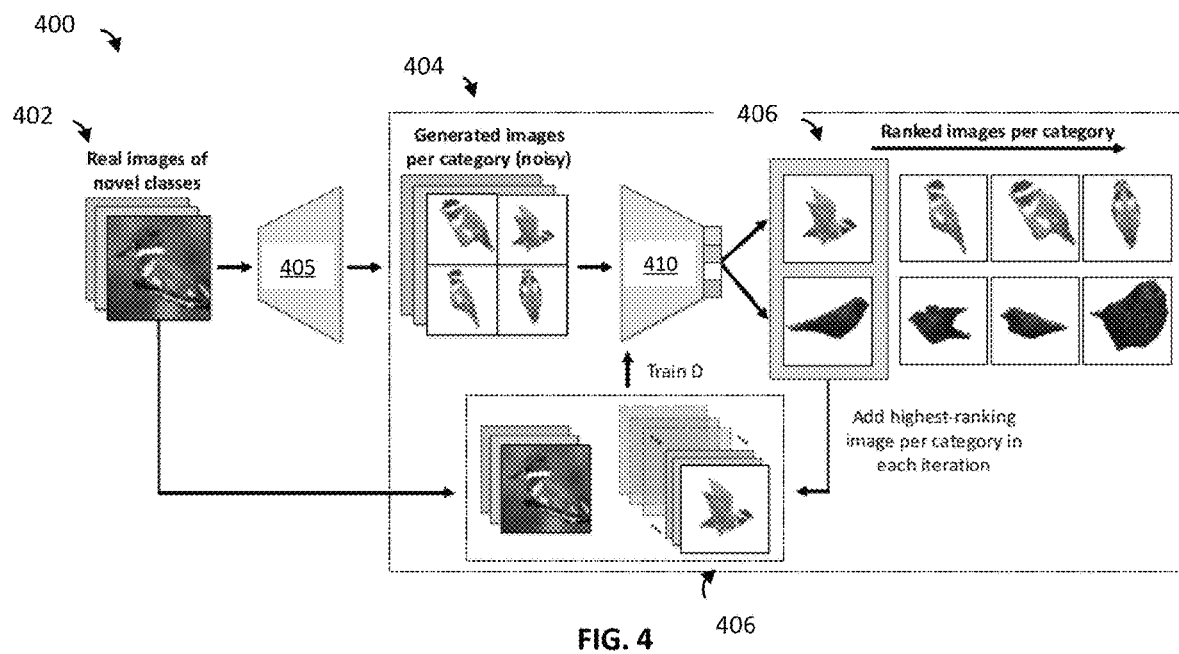
FIG. 4 depicts training an example of a generative adversarial network (GAN), in accordance with some example embodiments.

FIG. 4 depicts training an example of a self-paced generative adversarial network (GAN) 400, in accordance with some example embodiments. As shown in the example of FIG. 4, the GAN 400 includes a generator 405 and a discriminator 410. As further shown in FIG. 4, real (e.g., authentic) images of a novel class 402 may be inputted to the generator 405. The generator 405 may be configured to generate images 404. The generated images 404 may be based on a generic 3D mesh generated from a base class (e.g., base class samples 304). The generated images 404 may then be inputted into the discriminator 410. The discriminator 410 may be configured to detect fake (e.g., synthetic) samples by, for example, determining a distribution over the state of the sample (e.g., real or fake) based on the received inputs (e.g., generated images 404). The determined distribution may be represented as a loss distribution (not shown) which may indicate whether an analyzed sample is classified as authentic or synthetic. The discriminator 410 may also be configured to rank the inputted images per category (e.g., pose, angle, or the like) with the highest ranking images 406 representing images analyzed to be closest to (e.g., most similar to or most resembles) the real (e.g., authentic) images 404. As further shown in FIG. 4, the highest ranking images 406 may be added to the novel samples 404 and may be fed back to the discriminator 410 to update the discriminator 410 and improve its discriminatory and ranking functions. The updating the discriminator 410 may include training the discriminator 410 using a cross-entropy loss. The cross-entropy loss may be represented as a loss function indicating a difference between a probability distribution for authentic images and a probability distribution for synthetic images.

The training may further include updating the discriminator 410 with a loss distribution indicating how close the generated samples 404 resemble the real images 402. The loss distribution may include a probability that an input image (e.g., a generated sample 404) belongs to a particular classification (e.g., an authentic image classification or a synthetic image classification). The discriminator 410 may update its model based on the loss distribution to better discriminate between real (e.g., authentic) images and fake (e.g., synthetic) images. This process of generating images 404 and finding the highest ranking images 406 may be repeated multiple times to train the discriminator 410 and/or the generator 405.

In some aspects, the discriminator 410 may generate a score for the inputted images 404 indicating a closeness to the real images 402. The discriminator 410 may then rank the images 404 based on the generated score. The discriminator 410 may then output the top-ranked image 406 per category (e.g., pose, angle, or the like). The highest ranked images 406 may be fed back and inputted into the discriminator 410 to update the discriminator 410 to yield more accurate rankings as well as a higher class prediction accuracy as the quantity of novel samples increases.

Figure 5:
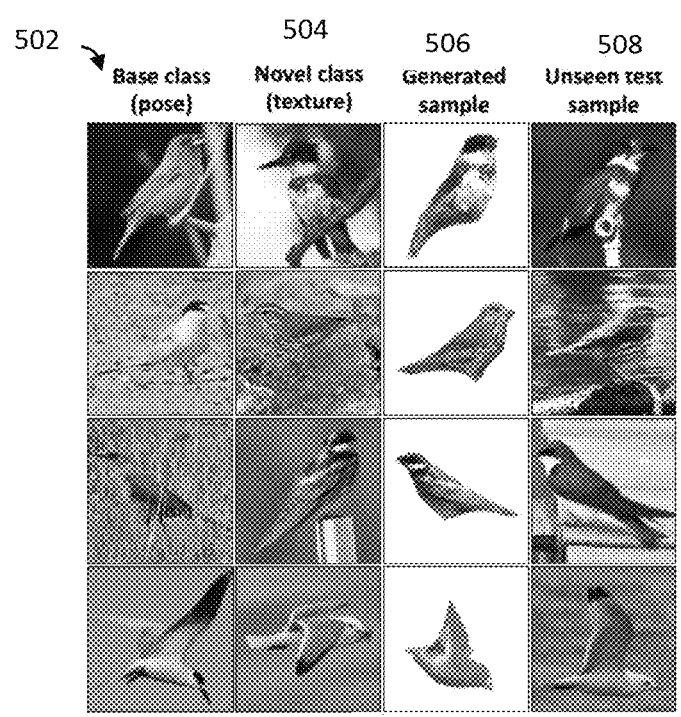
FIG. 5 depicts example outputs of a low shot learning system, in accordance with some example embodiments.

FIG. 5 depicts example outputs of a low shot learning system (e.g., system 400). In the example of FIG. 5, the first column 502 represents a base class in a specific pose (e.g., base class 304). The second column 504 represents a novel class sample (e.g., novel class 402 or 302). The third column 506 depicts generated samples that have been previously selected by the discriminator (e.g., discriminator 410) with respect to the image's class-discriminatory power. The image's class discriminatory power may be based on a calculated probability that the image (e.g., generated image 506) belongs to a particular class (e.g., an authentic class of images or a synthetic class of images). The fourth column 508, depicts unseen test samples (e.g., real or authentic images not yet processed by the system 400). As shown in FIG. 5, a difference between the generated samples 506 in the unseen test samples 508 may be analyzed and reflect a quality of the system 400 in generating quality samples 506 of the novel class 504. While images of birds are depicted in FIGS. 3-5, the low shot learning methods described herein may apply equally to other images or data. For example, the few shot learning described herein may also apply to object recognition scenarios where a network (e.g., network 400) is configured to detect or recognize an object within an image based on sample images, a 3D mesh, or other data.

Figure 6:
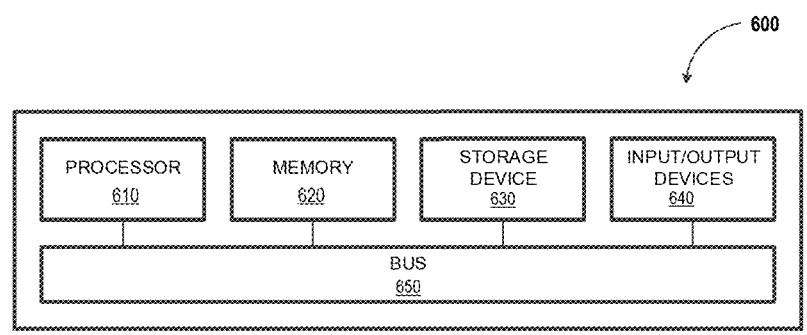
FIG. 6 depicts a block diagram illustrating a computing system, in accordance with some example embodiments.

FIG. 6 depicts a block diagram illustrating a computing system 600 consistent with implementations of the current subject matter. Referring to FIGS. 1-7, the computing system 600 can be used to implement the training engine 110, the neural network engine 140, the client device 130, the generator 405, the discriminator 410, and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the machine learning controller 110. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a solid state drive, a floppy disk device, a hard disk device, an optical disk device, or a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces. In some embodiments, the system 600 may include graphics processor units or other types of specialized processors for machine learning.

According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

Figure 7:
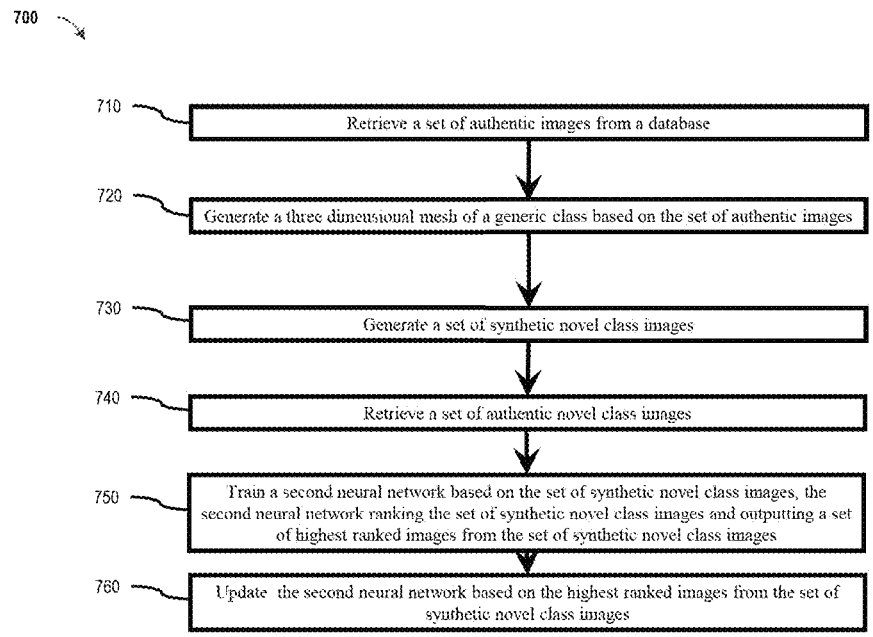
FIG. 7 depicts a flowchart illustrating an example of a process for generating synthetic images, in accordance with some example embodiments.

FIG. 7 depicts a flowchart illustrating an example of a process 700 for generating synthetic images (e.g., data), in accordance with some example embodiments. Referring to FIGS. 1-6, the process 700 may be performed by a computing apparatus such as, for example, the training engine 110, the neural network engine 140, the client device 130, the generator 405, the discriminator 410, a server, the computing system 600, and/or the like.

At operational block 710, the training engine 110 may retrieve a set of authentic images from a database (e.g., a database accessible by the training engine 110). For example, the set of authentic images may include authentic base class images (e.g., base class images 304). Referring to FIG. 1, the training engine 110 may retrieve from the client device 130 a set of images of a base class (e.g., an object in an environment).

At operational block 720, the training engine 110 may generate a generic three dimensional mesh of the base class based on the set of authentic base class images (e.g., base class samples 304). For example, the training engine 110 may aggregate the set of authentic base class images which may include images of an object from different viewpoints and generate the three dimensional mesh of the base class or object based on the different viewpoints.

At operational block 730, the training engine 110 (e.g., image generator 210) may generate a set of synthetic novel class images. For example and with reference to FIG. 4, a first neural network (e.g., the generator 405) may receive the authentic set of novel class images 402 and generate a set of synthetic novel class images 404. The generated images 404 may be based on a generic 3D mesh generated from a base class (e.g., base class samples 304). In some aspects, the generated images 404 may also be based on a random noise generator inputted to the generator 405. The generator 405 may be trained on samples from the base class (e.g., base class samples 304) to generate the images 404. The generated images 404 may also be based on capturing different viewpoints of the generic 3D mesh by rotating the 3D mesh and applying a texture of the novel class to the generic 3D mesh.

At operational block 740, the training engine 110 may retrieve a set of authentic novel class images. The set of authentic novel class images may be retrieved from a database accessible by the training engine 110. For example, the training engine 110 may retrieve the set of authentic novel class images from the client device 130. The set of authentic novel class images may only contain a few samples of the novel class.

At operational block 750, the training engine 110 may train a second neural network based on the set of synthetic novel class images. The second neural network may rank the set of synthetic novel class images. The second neural network may also output a set of highest ranked images from the set of synthetic novel class images. The second neural network may include a discriminator (e.g., discriminator 410) configured to calculate a loss distribution which indicates whether an input (e.g., a generated image 404) should be classified as belonging to a particular class (e.g., real (e.g., authentic) or fake (e.g., synthetic)). The second neural network may be trained by inputting real (e.g., authentic) samples to the discriminator 410 so that the discriminator 410 may learn whether past classifications or rankings were correct and may update its model based on the authentic samples.

At operational block 760, the training engine 110 (e.g., via performance auditor 214) may update the second neural network based on the highest ranked images from the set of synthetic novel class images. For example and with reference to FIG. 4, the second neural network (e.g., the discriminator 410) may output a ranking of the inputted images 404 and may select the top-ranked image 406 per category. The highest ranked images 406 may be fed back and inputted into the discriminator 410 to update the discriminator 410. The highest ranked images 406 may also be added to the set of authentic images 402 to improve diversity of the novel class and update the generator 405.

The process 700 and other embodiments described herein may also apply to other low-shot scenarios. For example, the process 700 for generating synthetic images (e.g., data) may also apply to object recognition scenarios. In some implementations, the network 400 may be configured to detect an object within an image. Examples of such objects may be categories of products (e.g., shoes, jewelry etc.), where visual/textual information of them may be available (e.g., in a form of catalog or manual), and the task may be to find similar product(s) on a database containing another set of images (such as web images on the Internet). In some aspects, the network 400 may be trained using a base class (e.g., catalog or manual) that includes visual and/or textual information about an object. The network 400 (e.g., discriminator 410) may receive a set of novel class images (e.g., web images) and may be configured to detect whether a desired or target object is located within the novel class images based on a ranking of the inputted novel class images.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   retrieving, from a database, a set of authentic base class images;
   generating, based on the set of authentic base class images, a three dimensional mesh of the base class;
   retrieving a set of authentic novel class images;
   generating, at a first neural network and based on the three dimensional mesh and the set of authentic novel class images, a set of synthetic novel class images; and
   training a second neural network based on the set of synthetic novel class images, the second neural network ranking the set of synthetic novel class images and outputting a set of highest ranked synthetic images from the set of synthetic novel class images;
   wherein training the second neural network further comprises updating the second neural network based on the highest ranked synthetic images from the set of synthetic novel class images.

2. The system of claim 1, further comprising adding the set of highest ranked images to the set of authentic novel class images, wherein generating the set of synthetic novel class images is further based on the set of highest ranked synthetic images.

3. The system of claim 2, further comprising training the first neural network based on the set of highest ranked synthetic images.

4. The system of claim 1, wherein training the second neural network further comprises updating the second neural network based on a loss distribution, the loss distribution indicating whether the output synthetic novel class images are classified as authentic or synthetic.

5. The system of claim 1, wherein the base class images comprises a set of images having a plurality of samples and the novel class images comprises a set of images having fewer samples than the base class images.

6. The system of claim 1, wherein generating the set of synthetic novel class images comprises altering the three dimensional mesh based on an authentic novel class image of the set of authentic novel class images.

7. The system of claim 6, wherein altering the three dimensional mesh comprises rotating the three dimensional mesh to capture one or more viewpoints of the authentic novel class image.

8. The system of claim 6, wherein altering the three dimensional mesh comprises adding a texture of the authentic novel class image to the three dimensional mesh.

9. The system of claim 1, wherein ranking the set of synthetic novel class images comprises scoring the set of synthetic novel class images per category based on a similarity to the set of authentic novel class images.

10. The system of claim 9, wherein the highest ranked synthetic images comprise the images with the highest score per category of image.

11. The system of claim 1, wherein generating the set of synthetic novel class images is based on a pose and a viewpoint of a base class image of the set of authentic base class images.

12. A computer-implemented method, comprising:
retrieving, by a processor from a database, a set of authentic base class images;
generating, by the processor and based on the set of authentic base class images, a three dimensional mesh of the base class;
retrieving a set of authentic novel class images;
generating, at a first neural network and based on the three dimensional mesh and the set of authentic novel class images, a set of synthetic novel class images; and
training a second neural network based on the set of synthetic novel class images, the second neural network ranking the set of synthetic novel class images outputting a set of highest ranked synthetic images from the set of synthetic novel class images;
wherein training the second neural network further comprises updating the second neural network based on the highest ranked synthetic images from the set of synthetic novel class images.

13. The method of claim 12, further comprising:
adding the set of highest ranked synthetic images to the set of authentic novel class images, wherein generating the set of synthetic novel class images is further based on the set of highest ranked synthetic images.

14. The method of claim 13, further comprising training the first neural network based on the set of highest ranked synthetic images.

15. The method of claim 12, wherein generating the set of synthetic novel class images comprises altering the three dimensional mesh based on an authentic novel class image of the set of authentic novel class images.

16. The method of claim 14, wherein training the second neural network further comprises updating the second neural network based on a loss distribution, the loss distribution indicating whether the output synthetic novel class images are classified as authentic or synthetic.

17. The method of claim 15, wherein altering the three dimensional mesh comprises rotating the three dimensional mesh to capture one or more viewpoints of the authentic novel class image.

18. The method of claim 12, wherein ranking the set of synthetic novel class images comprises scoring the set of synthetic novel class images per category based on a similarity to the set of authentic novel class images.

19. The method of claim 12, wherein generating the set of synthetic novel class images is based on a pose and a viewpoint of a base class image of the set of authentic base class images.

20. A non-transitory computer readable medium storing instructions, which when executed by at least one data processor, result in operations comprising:
retrieving, from a database, a set of authentic base class images;
generating, based on the set of authentic base class images, a three dimensional mesh of the base class;
retrieving a set of authentic novel class images;
generating, at a first neural network and based on the three dimensional mesh and the set of authentic novel class images, a set of synthetic novel class images; and
training a second neural network based on the set of synthetic novel class images, the second neural network ranking the set of synthetic novel class images outputting a set of highest ranked synthetic images from the set of synthetic novel class images;
wherein training the second neural network further comprises updating the second neural network based on the highest ranked synthetic images from the set of synthetic novel class images.

* * * * *